(No Model.) 2 Sheets—Sheet 1.
F. W. ULFFERS.
BEARING FOR PIVOTS, AXLES, AND SHAFTS.
No. 301,412. Patented July 1, 1884.
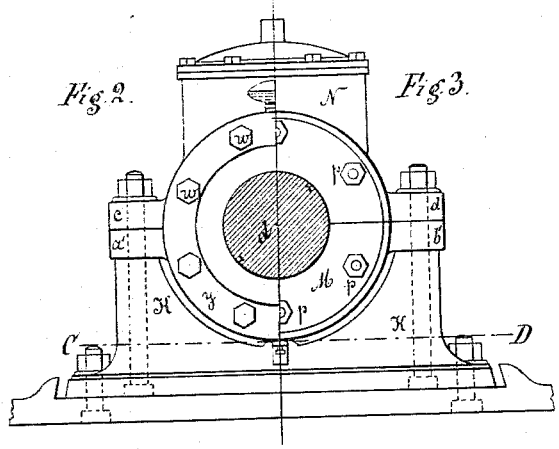
Fig. 2. Fig. 3.
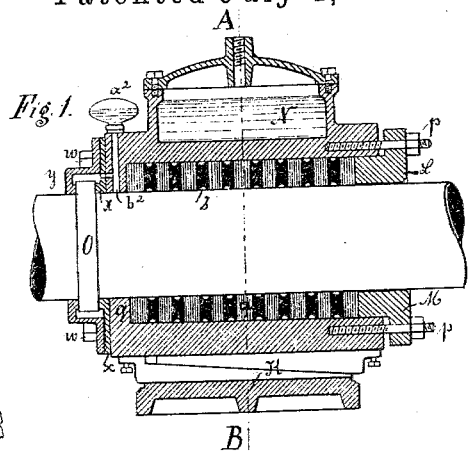
Fig. 1.
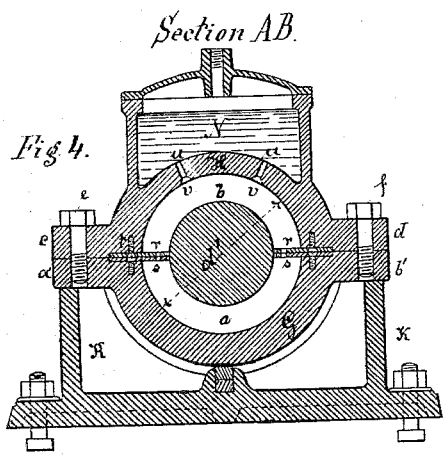
Fig. 4. Section AB.
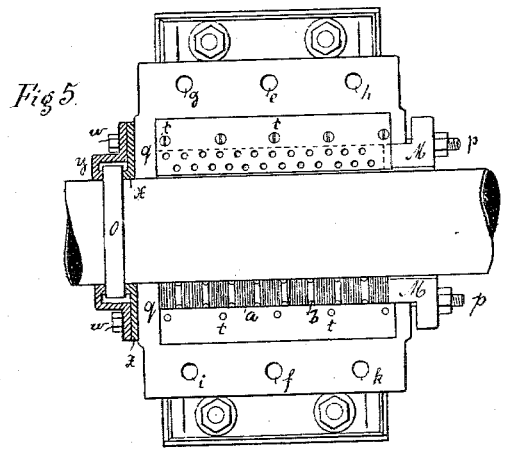
Fig. 5.
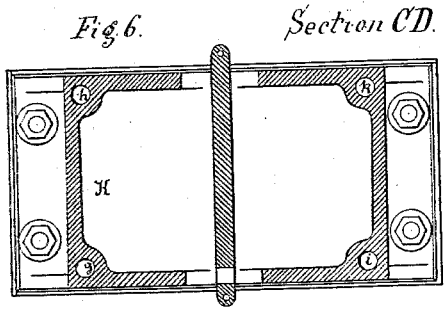
Fig. 6. Section CD.
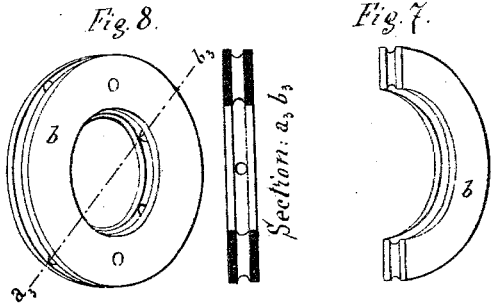
Fig. 8. Fig. 7.
Witnesses:
John C. Sarter
James F. Tobin
Inventor
Friedrich W. Ulffers
by his Attorneys
Howson & Sons (No Model.) 2 Sheets—Sheet 2.
F. W. ULFFERS.
BEARING FOR PIVOTS, AXLES, AND SHAFTS.
No. 301,412. Patented July 1, 1884.
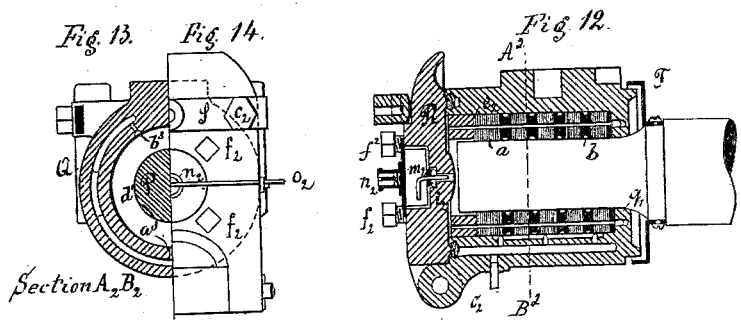
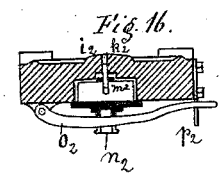
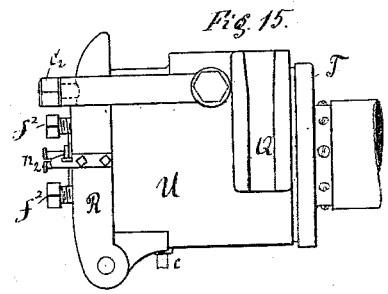
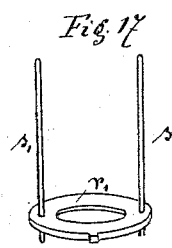
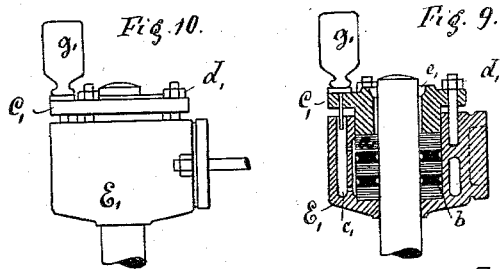
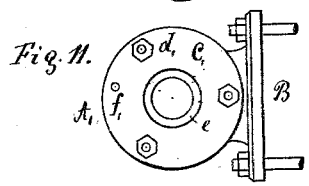
Witnesses:
James F. John
John E. Parker
Inventor
Friedrich W. Ulffers
by his Attorneys
Howson & Sons

UNITED STATES PATENT OFFICE.

FRIEDRICH WILHELM ULFFERS, OF BERLIN, GERMANY, ASSIGNOR TO S. FRENKEL, (FIRM,) OF SAME PLACE.

BEARING FOR PIVOTS, AXLES, AND SHAFTS.

SPECIFICATION forming part of Letters Patent No. 301,412, dated July 1, 1884.

Application filed November 5, 1883. (No model.) Patented in Germany May 19, 1883, No. 24,837; in Belgium September 29, 1883, No. 62,743; in France October 1, 1883, No. 157,794; in England October 17, 1883, No. 4,962; in Italy December 31, 1883, XXXI, 474, and in Sweden January 14, 1884.

*To all whom it may concern:*

Be it known that I, FRIEDRICH WILHELM ULFFERS, of the city of Berlin, in the Kingdom of Prussia, Germany, have invented certain new and useful Improvements in Bearings for Pivots, Axles, Shafts, &c., of which the following is a specification.

My improvement in bearings is based on the valuable property of parchment-paper, which in packets damped and powerfully compressed forms a substance possessing a high power of resistance, stiffness, homogeneity, and smoothness, the crosscut-surfaces showing an extraordinarily low measure of wear under the friction of smooth metallic surfaces. The properties possessed by this substance render it suitable both for application as stuffing-box packing and for simple bearings, and the fact that even when long exposed to boiling-heat under the ordinary pressure of the atmosphere no injurious changes are produced, causes its applicability to be still further increased. The water which is applied to the material for the purpose of causing it to swell, at the same time acts as an excellent lubricating agent. The use of a greasy lubricant alone becomes superfluous, and I only use very small quantities of oil, therefore, when metal also works simultaneously on metal, where, as in the case of iron shafts, it is required to prevent the formation of rust on the bearing-surfaces without it being necessary to provide a brass skin or other surrounding protective covering.

The accompanying drawings represent the system in three different methods of construction, the carrying out of the details of which may of course vary according to circumstances.

Figures 1 to 8, inclusive, show, as an example of construction, an upright bearing-block for heavy shafts of about two hundred millimeters diameter. Figs. 9 to 11, inclusive, show a light wall-bearing block; and Figs. 12 to 17, an axle-box bearing for railway-vehicles, &c.

In the upright bearing-block a cast-iron body, K, Figs. 1, 2, 3, 4, and 6, carries two semi-cylindrical bearing-pieces, G and H, by means of the flanges $a'\ b'\ c\ d$, which fit close together, Figs. 2, 3, and 4. The interior of these bearing-pieces is bored out to the diameter $d'$, and forms a hollow cylinder quite open on one side, but on the other side, $q$, closed down to the diameter of the shaft. Two screws, $e$ and $f$, connect these bearing-pieces together, while four bolts, $g$, $h$, $i$, and $k$, effect connection with the body K. The bearing proper consists of peculiar packing-pieces of half-ring-shaped layers of parchment-paper $a$, Figs. 1 and 5, pressed together, the leaves of which stand vertically, and of metallic grooved half-rings $b$, (enlarged view, Fig. 7,) the largest diameter of which equals $d'$, while the diameter of their inner surfaces is only a little larger than the shaft-journal, the shaft being particularly well turned and finished or polished at the journal part only. Two semicircular covering-pieces, L, for the upper bearing-piece, and M for the lower one, having a diameter equal to that of the half-ring $b$, Figs. 1, 3, and 5, allow of each of the packings $a\ b$ being compressed by means of three screwed studs, $p$, against the end $q$ of the bearing-pieces. The flat planed surfaces of the flanges $a'\ b'$ and $c\ d$ are provided with shallow rectangular recesses designed for the reception of rigid drilled plates $r$ and $s$, respectively attached to the surfaces G and H. These plates $r$ and $s$ on the one hand serve to lock the bearing-pieces in position and to guide them when pressed, while on the other hand the holes in them form a communication between the grooves of the upper and lower half-rings $b$, and, finally, they prevent the carrying round of the packing by the shaft when working. The bearing-piece H carries a water-vessel, N, the cover of which is put on loosely or is screwed on and jointed, according as N (with or without the employment of a regulator) may be filled at intervals or kept perfectly full from a reservoir at a slight pressure. Radial holes $u$ and two grooves, $v$, Figs. 1 and 4, running parallel lengthwise of the shafts, place the contents of N in communication with the collective grooves of the half-rings $b$, and through these with the packings $a$ and the surface of the shafts, holes in $r$ and $s$ also allowing free passage of the liquid to the lower packing. A thin joint outside the holes prevents the escape of the feed-water between the flanges $a'$ $b'$ and $c$ $d$. In the case where means are not already employed for the prevention of longitudinal displacement of the shaft, (as, for example, the recessed or simple thrust bearings used for screw-shafts by guide plates or ridges,) or the usual guides for the proper working of the shaft-journal are not employed, I provide the shaft with a stop-ring, O, held by each of the two carrying-pieces $x$ and $y$, Figs. 1 and 5, which come together with vertical joints. The half-rings $x$ and $y$ are each firmly attached by four screws, $w$, to the end surface, $q$, of the bearing-pieces. A small lubricator, $a^2$, keeps this part of the bearing lubricated with oil through the vertical opening $b^2$, Fig. 1. The small quantity of oil which spreads from here over the whole surface of the bearing protects the shaft from rust.

The method referred to of alternately placing a more or less thick layer of parchment-paper, having its edge to the shaft with intermediate metallic ring-shaped parts, may be said to be typical for the construction of my bearings, as I would only employ bearing-packings of parchment-paper without metallic intermediate disks exceptionally, where the usual lubricating channels or grooves might be cut direct in the parchment-paper substance. The application of such a sure and copious water-supply by means of intermediate metallic disks, permits of the complete utilization of the valuable properties of the parchment-paper as a material for bearings, while on the one hand the single-ring pieces made of it are completely inclosed, and possess elasticity up to a certain very useful degree; but being placed between relatively inelastic and rigid bodies the highest measure of resistance against surface-pressure is imparted on the other hand by reason of the relatively slight thickness of the individual compressible layers, (which thickness may of course vary according to circumstances,) unnecessary radial pressure against the surface of the journal is prevented, and, finally, these intermediate metallic parts afford the best prevention of torsion within the packing itself, or of a circular travel of the whole packing by the action of the shaft, even in the case where bearings not in two parts are employed. Further, the metallic parts also form an important part as good conductors of heat, where, on account of a particularly heavy bearing-surface, pressure or a high revolving speed, heating takes place through friction, notwithstanding the cooling water lubricant, which heat then becomes distributed over the whole bearing-block. In the simple wall-bearing, Figs. 9 to 11, the bearing-packing consists of entire rings slid in from the front. The packing is placed in a double-walled cylindrical bearing-block, E', cast in one piece, the hollow space C' of which, filled with water, communicates with the packing through horizontal holes, which are again connected to each other by vertical grooves. The four radial holes in the metallic intermediate parts, formed as shown in Fig. 8, conduct the necessary water to the surface of the journal. A compressing-cover, attached by screws $d$ to the bearing-block, is provided with a small oil-groove, $e'$, and has at $f'$, Fig. 11, a vertical hole for fitting on a lubricating-vessel, $g'$, filled with water. The axle-bearing represented in vertical longitudinal section, Fig. 12, half cross-section, Fig. 13, (through line $A^2$ $B^2$,) half front view, Fig. 14, and side elevation, Fig. 17, is on the same principle of construction as those first described. The journal P has at its root only a slight incline outward, which, however, does not operate against longitudinal displacement. The substantially-cylindrical axle-box is double-walled for the greater portion of its circumference. Its annular hollow space is entirely interrupted only at the uppermost zone and near the end part, $q'$, Fig. 12, where the side grooves, Q, necessitate a strengthening of the walls. Radial holes $a^3$ and $b^3$ and corresponding longitudinal grooves again effect communication between the bearing part and the annular hollow space, which latter is supplied with the requisite water through a small tube, $c^2$. The bearing completely surrounds the journal. The packing consists of inclosed parchment rings $a$ and metallic rings $b$, Figs. 8 and 12. They are put on a ring-fork, $r'$, Figs. 12 and 17, having rigid legs $s'$, the thicker ends of which are introduced into corresponding holes in the end of the bearing-frame $q'$, and it is then passed into the body of the bearing-block. The end surface of the bearing-block carries a strong hinged flap, R, which may be fastened by a pivoted strap, S; but the form and position of the fastening may of course vary according to the kind of springs used and the method of fastening them. A simple joint-ring set in the end surface of the bearing-block makes the closure tight. By means of this compressing-ring $e^2$, Fig. 12, suitably turned to the diameter $d'$, Fig. 13, and of the four set-screws $f^2$, Figs. 12, 14, and 15, the packing is kept under pressure. Two holes corresponding to the position of the forked legs $s'$, Fig. 17, allow the front ends of these legs to pass through $e^2$. The legs $s'$, in combination with the friction caused by the great pressure at the end surfaces of the packing, prevent the turning round of the packing. A central projection, $i^2$, Figs. 12 and 16, on the flap R, in conjunction with the corresponding projecting part in the opposite axle-box, prevents excessive longitudinal displacement of the axle. The controlling-surface $i^2$ receives a little oil lubricant, which also in this case sufficiently greases the whole of the journal to keep it free from rust. A shallow cylindrical lubricating-box, $m^2$, Figs. 12 and 16, with a small lubricating-tube, $K^2$, bent downward at right angles, passes into a corresponding hole in the flap R. The center of this lubricating-box carries a small horizontal slit hollow cylinder, $n^2$, inside of which is fixed a small spiral spring. By means of this spiral spring and of a slightly-yielding hinged lever, $o^2$, Fig. 16, with catch arrangement, this lubricating-box is held fast. Immediately behind the journal the axle carries a capsule-ring, T, the outer border circumscribing, with space for play, the outer surface of the axle-box, which is turned at that part. This simple arrangement protects the inside of the bearing from dirt.

I claim as my invention—

1. A bearing or stuffing box having a bearing-surface consisting of compressed parchment-paper, with the edge-surface of the leaves against the shaft, substantially as set forth.

2. A bearing or stuffing box having a bearing-surface consisting of compressed layers or packets of parchment-paper, with intermediate metallic rings, substantially as set forth.

3. The combination of a bearing-box having a bearing-surface consisting of semi-annular packets of parchment-paper, with intermediate semi-annular metallic pieces and guide-plates $r\ s$, substantially as described.

4. The combination of a bearing-box having a bearing-surface of compressed layers or packets of parchment-paper, with intermediate perforated metallic pieces and a water-supply and water-channels to the parchment layers, as and for the purpose specified.

5. The combination of a bearing-block, K, and bearing-pieces G H, with semi-annular parchment-packets, intermediate metallic pieces, and perforated guide-plates $r\ s$.

6. The combination of a bearing-box, packets of parchment-paper, and intermediate metallic pieces, with pressure-rings to compress the paper, substantially as set forth.

7. The combination of bearing-pieces G H and a shaft having a stop-ring, $o$, with carrying-piece $x\ y$, made in two parts, substantially as described.

In testimony whereof I have signed my name to this specification in the presence of two subscribing witnesses.

FRIEDRICH WILHELM ULFFERS.

Witnesses:
B. ROI,
MARS M. ROSSEN.